United States Patent [19]

Hoffmann et al.

[11] Patent Number: 4,744,997

[45] Date of Patent: May 17, 1988

[54] METHOD FOR PRODUCING GUM CANDY

[75] Inventors: Peter Hoffmann, Heidelberg; Klaus Bräumer, Eberbach, both of Fed. Rep. of Germany

[73] Assignee: Deutsche Gelatine-Fabriken Stoess & Co. GmbH, Fed. Rep. of Germany

[21] Appl. No.: 887,951

[22] Filed: Jul. 22, 1986

[30] Foreign Application Priority Data

Jul. 24, 1985 [DE] Fed. Rep. of Germany ....... 3526376

[51] Int. Cl.⁴ ........................... A23G 3/12; A23G 3/00
[52] U.S. Cl. ..................... 426/576; 426/660; 426/512; 426/516; 425/542; 425/547
[58] Field of Search ............... 426/576, 516, 660, 512; 425/542, 547

[56] References Cited

U.S. PATENT DOCUMENTS

| | | | |
|---|---|---|---|
| 2,166,568 | 7/1939 | Kuhlke | 107/54 |
| 2,679,866 | 6/1954 | Crawford | 138/44 |
| 2,847,311 | 8/1958 | Donmack et al. | 99/134 |
| 3,265,508 | 8/1966 | Wurzburg et al. | 426/516 |
| 3,265,509 | 8/1966 | Wurzburg et al. | 426/516 |
| 3,908,032 | 9/1975 | Didelot et al. | 426/516 |
| 3,927,221 | 12/1975 | Kalafatas | 426/576 |
| 4,271,206 | 6/1981 | Fariel et al. | 426/572 |
| 4,273,793 | 6/1981 | Fariel et al. | 426/572 |
| 4,407,836 | 10/1983 | Bosco et al. | 426/576 |
| 4,540,592 | 9/1985 | Myer et al. | 426/557 |
| 4,567,055 | 1/1986 | Moore | 426/578 |

FOREIGN PATENT DOCUMENTS

| | | |
|---|---|---|
| 715793 | 5/1968 | Belgium . |
| 3417196 | 11/1985 | Fed. Rep. of Germany . |
| 618575 | 3/1927 | France . |
| 2228436 | 12/1974 | France . |
| 2297574 | 8/1976 | France . |
| 149681 | 4/1932 | Switzerland . |
| 656290 | 6/1986 | Switzerland . |
| 746644 | 3/1956 | United Kingdom . |
| 171728 | 6/1965 | U.S.S.R. . |

OTHER PUBLICATIONS

"Extrusion Process for Aerated Sweets" Confectionery Production pp. 34–38 (Jan. 1976).
Zuker und Zuckerwaren, Hartmut Hoffmann et al, pp. 179–192 (1985).

Primary Examiner—Jeanette Hunter
Attorney, Agent, or Firm—Leydig, Voit & Mayer

[57] ABSTRACT

A gum candy made from a basic sugar-gelatin mass is produced by either preparing the basic mass, if required with the addition of additives, in an injection molding machine and injecting (molding) it immediately subsequent to preparation or preparing the basic mass in conventional boiling apparatuses and molding it with the aid of an injection molding machine, in both cases with the final water content.

13 Claims, 1 Drawing Sheet

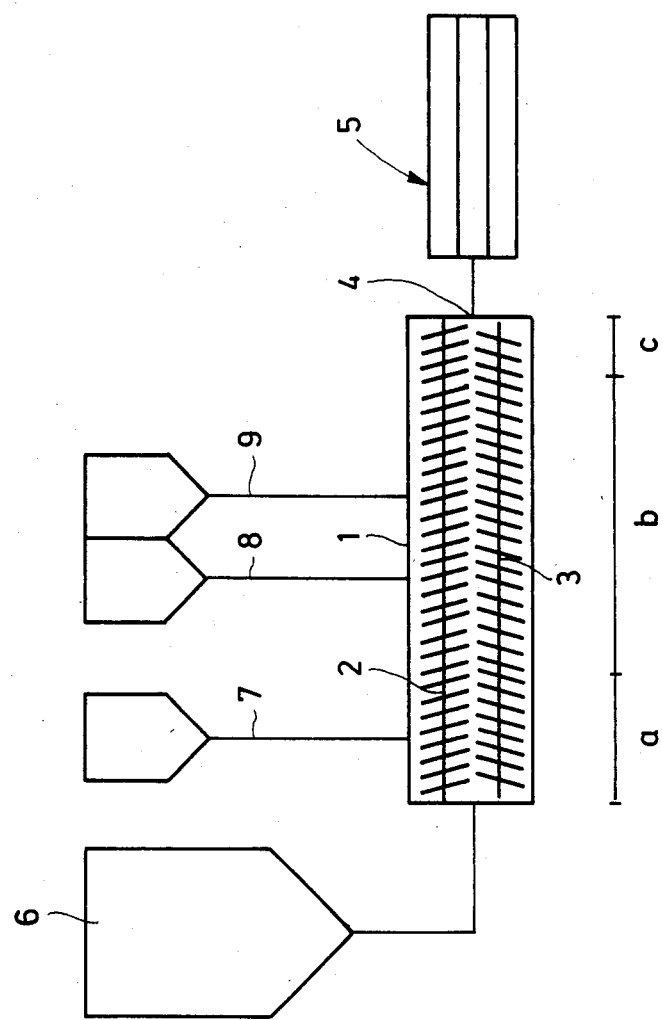

METHOD FOR PRODUCING GUM CANDY

The invention relates to a method for producing gum candy from a basic sugar-gelatin mass. In addition, the invention relates to apparatus for carrying out such a method.

Gum candy, in particular gumdrops and wine gums, has previously been produced as follows: A thin, hot basic sugar-gelatin mass is prepared and injected into molds made of starch powder at a place separate from the place of preparation. The positive mold which is open at the top is pressed beforehand into the starch powder, which is contained in flat molding boxes, during a punching process. The basic mass is poured into the resulting negative mold in the starch powder and the powder boxes are then dusted with starch powder and dried. Subsequently, the powder boxes are turned over and emptied. The gum candies are separated from the starch by a screen, brushed off, blasted and conveyed to a final packaging stage. The starch powder is generally dried and returned to the production cycle.

The known method has various disadvantages. The water added to the basic mass must be removed again in a subsequent drying process which entails high energy costs. Gelatin and other gelling agents are impaired by the high temperatures necessary for pouring (65° to 85° C.). This impairment must be compensated for by using a greater amount of gelling agent which leads to high raw material costs. Moreover, partial Maillard reactions may hereby occur; these affect the appearance and taste of the gum candy and may therefore result in a diminished quality. The amount of water to be removed from the candy is withdrawn with the aid of starch powder. The starch powder then has to be dried again to a specific moistness and this entails additional energy costs. Finally, the starch powder used is a source for bacterial impurities and may lead to an impairment with regard to hygiene.

The object of the invention is to eliminate the deficiencies of the known method described above and to produce gum candy in a hygienic manner and more economically than before, at the same time saving energy and raw materials.

The object is accomplished in that the basic sugar-gelatin mass is prepared with the final water content, if required with the addition of additives such as colorings, flavorings, stimulants or the like, and then injected into an injection mold from an extruder, preferably immediately following its preparation.

Essential advantages of this method are to be seen in the fact that it is unnecessary for the basic mass to be transported long distances since the mass can be prepared on the spot, in particular in the extruder, and molded by injection. No intermediate drying takes place since the extrudable basic mass already has the required final water content. Starch powder is required as a drying agent. This results altogether in a considerable saving of energy and raw material costs, at the same time meeting hygienic requirements.

The following description of various embodiments of the invention serves to explain the invention in greater detail in conjunction with the attached drawing which is a schematic illustration of an injection molding machine.

The basic concept of the invention is no longer to cast gum candy in a starch powder mold but to mold the basic mass directly at the place where it is prepared.

The extruders (injection molding machines) used in this case may be the same as those used, for example, in the plastics industry.

The drawing is a schematic illustration of a twin-screw extruder which is known per se and has two driven contrarotating screws 2, 3 mounted in a housing 1. The extruder has an extrusion opening 4 at its right-hand end. The basic mass which is to be extruded and has been rendered soluble is injected from this extrusion opening directly into an injection mold 5. The injection mold 5 may be multilayered in design and contain in each layer a great number of individual molds for the gum candy to be produced, for example gumdrops. A preliminary vessel or tank 6 contains a raw mass for preparation of the basic mass, this raw mass consisting, for example, of a mixture of water, pre-swollen gelatin granulate and sugar. Aqueous gelatin solutions or additives such as, for example, colorings, flavorings, stimulants or the like, may be introduced into the extruder at the desired area by way of dosaging lines 7, 8 and 9. These additives may also be added, if required, to the raw mass in the preliminary vessel 6.

The raw mass in the preliminary tank 6 is relatively viscous and contains a quantity of water which is just sufficient for the mass to be transferred from the preliminary tank to the extruder under pressure. In the extruder, the raw mass comes under the sphere of influence of the two screws 2, 3. It is thoroughly kneaded by these screws, while being subjected to pressure, and moved towards the extrusion opening 4. The pressures exerted in the extruder may be between 10 and 150 bars, preferably between 20 and 100 bars.

For preparation of the basic mass, the extruder may be heated or cooled in zones, for example in zone a to a first temperature and in zone b to a second temperature. In zone c, i.e. immediately upstream of the injection opening 4, the extruder and, with it, the basic mass may be cooled to the required extrusion temperature. The basic mass is heated to temperatures of between 60° and 130° C., in particular 80° to 100° C. Temperature control enables the raw mass to be rendered soluble, i.e. the solid matter content, e.g. saccharose, to be dissolved. The injection molding device (injection opening 4) is cooled to achieve a rapid setting of the injected mass and, consequently, a high product throughput. The bubbles of air contained in the raw mass may be removed via deaerating zones provided on the injection molding machine and this allows the production of a clear gelatin candy free of air bubbles.

In a preferred embodiment of the method, the raw mass introduced into the extruder contains gelatin in the form of a granulate pre-swollen in water. It has been found that this granulate is excellent for further processing in the extruder, in particular by means of a screw, together with the additional components of the basic mass. The raw mass may also contain a mixed sugar-gelatin granulate which may likewise be rendered soluble in the extruder to form an extrudable, clear basic mass.

Finally, the raw mass may also contain a powdered, cold-swelling gelatin ("instant gelatin").

In conjunction with conventional boiling apparatuses, the clear basic mass which has been rendered soluble and has the required final water content may be pumped into a simple injection molding machine and injected into the injection mold, i.e. for the purpose of shaping. In this case, the injection molding machine is used merely as a molding device, the basic mass being prepared in the boiling apparatus.

In this way, gum candies in the form of relatively complicated solid bodies may also be produced quickly and simply by injection molding, in particular without any special subsequent treatment.

These solid bodies may also be filled. This is carried out in a simple manner by using an injection mold having a plurality of injection points (coextrusion); in this case, the basic mass encloses the filling mass. The filling mass may contain vitamins, fruit preparations and/or proteins. In another embodiment of the invention, the basic mass itself is enriched with certain nutrients, for example albumens.

In contrast to the known gum candies, the gum candies produced in accordance with the invention are not flat and only shaped on one side. On the contrary, the candies are shaped on all sides due to the injection molds used.

The injection mold 5 may be sprayed beforehand with separating wax to enable the injected gum candies to be removed more easily. In addition, molds may be used which are made of materials, e.g. Teflon, to which the basic mass does not stick and so it can be removed without difficulty from the opened injection mold after it has cooled completely. The finished candy shapes can also be oiled separately with separating wax, for example in conventional oiling drums.

The main advantage of the inventive method is the fact that, on the one hand, the basic mass can be rendered soluble (prepared) and molded in a single apparatus having a relatively simple construction and, on the other hand, the basic mass which is prepared with the aid of conventional boiling apparatuses can be molded considerably more rationally.

In addition, it is significant that the basic mass of the candy can already be produced with the required final water content and need no longer be dried. This results in a considerable saving in energy costs and requires less space for production as a whole as no (air-conditioned) drying rooms are needed.

The invention will now be explained in more detail on the basis of a few examples:

EXAMPLE 1

A gum candy mass is produced in a separate boiling unit. An injection molding machine serves as molding apparatus. The mass consists of:
33.5 kg saccharose
43.5 kg glucose syrup
6.5 kg gelatin, 260 bloom
12.0 kg water 6.5 kg of gelatin granulate are dissolved in 12.0 kg of water and added to the saccharose and glucose syrup. This mixture is conducted over a spiral boiling apparatus. The temperature is 108° C., the vapor pressure 0.6 bars. Evacuation then follows, whereby the temperature drops to approximately 65° C. and a water content of approximately 18% is obtained. The mass is now pumped (1–50 bars) into an injection molding machine (extruder with injection mold). The temperatures in the machine zones (see FIGURE) are:
zone a: 70°–40° C.
zone b: 40°–30° C.
zone c: 5°–20° C. (cooling of the injection opening 4)

EXAMPLE 2

The ingredients are premixed in a heatable agitating tank and pumped into the injection molding machine (extruder) where they are rendered soluble (dissolved) and molded. The preliminary mixture consists of:
33.5 kg saccharose
43.5 kg glucose syrup
6.5 kg gelatin, 260 bloom
6.5 kg water The ingredients are premixed at 40°–60° C. and, once a homogeneous mixture has been obtained, pumped into the injection molding machine (1–50 bars). The temperatures of the zones in the injection molding machine are:
zone a: 120°–160° C.
zone b: 120°–80° C.
zone c: 5° to +20° C. (cooling of the actual injection device).

EXAMPLE 3

The procedure is the same as for Example 2. The products are enriched with albumen, e.g. albumen sold under the brand name "Gelita-Sol E".
31.0 kg saccharose
41.0 kg glucose syrup
5.0 kg Gelita-Sol E
6.5 kg gelatin, 260 bloom
7.0 kg water Citric acid and/or other stimulants, colorings and flavorings are added in all the Examples as required.

The gum candies are waxed with vegetable fats or oils subsequent to shaping (injection molding) to prevent them from sticking to one another and to give the products a shiny appearance.

What is claimed is:

1. A method of producing gum candy having a desired final water content from a basic sugar-gelatin mass comprising the steps of:
   (a) preparing a basic sugar-gelatin mass in an extruder from a raw mass containing gelatin in the form of a granulate pre-swollen in water, said raw mass having a water content substantially corresponding to that of the desired final water content of said gum candy,
   (b) supplying said basic sugar-gelatin mass from the extruder to an injection mold, and
   (c) molding said gum candy.

2. Method as defined in claim 1, wherein a raw mass containing a mixed sugar-gelatin granulate is introduced into said extruder for preparation of said basic mass.

3. Method as defined in claim 1, wherein said basic mass is prepared in said extruder under increased pressure.

4. Method as defined in claim 1, wherein said basic mass is prepared in said extruder at an elevated temperature.

5. The method defined in claim 1, wherein said extruder comprises two contrarotating screws.

6. The method defined in claim 1, wherein said extruder is heated or cooled by zones.

7. A method of producing gum candy according to claim 1 wherein at least one of a coloring, flavoring, and stimulant is added when said basic sugar-gelatin mass is prepared with the desired final water content.

8. The method as defined in claim 1 wherein said extruder has an extrusion opening communicating with said injection mold and is cooled upstream of said opening.

9. The method as defined in claim 1 wherein the temperature of the basic sugar-gelatin mass is adjusted to a temperature effective for extrusion prior to transferring the basic sugar-gelatin mass from the extruder to the injection mold.

10. The method as defined in claim 9 wherein the temperature effective for extrusion is from about 5° to 20° C.

11. The method as defined in claim 9 wherein the basic sugar-gelatin mass is heated prior to adjusting the temperature to an effective extrusion temperature.

12. The method as defined in claim 11, wherein the temperature to which the basic sugar-gelatin mass is heated prior to adjusting the temperature to an effective extrusion temperature is from about 60° to about 130° C.

13. The method as defined in claim 3 wherein said pressure is in the range about 10 to 150 bars.

* * * * *